UNITED STATES PATENT OFFICE.

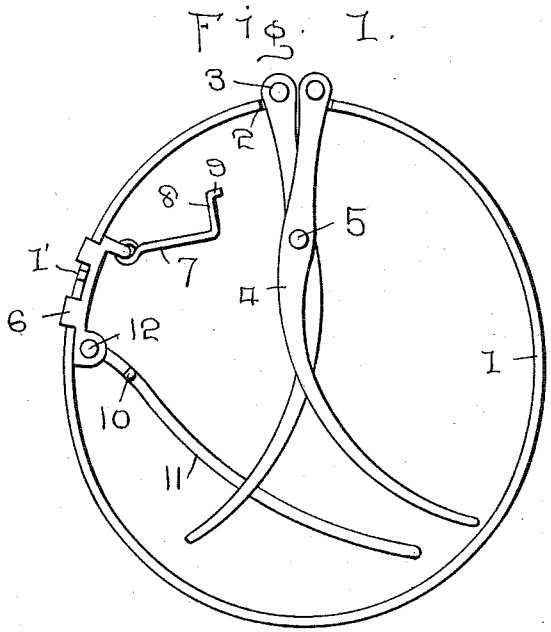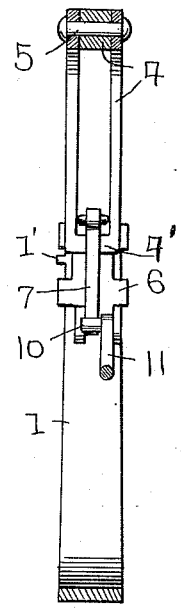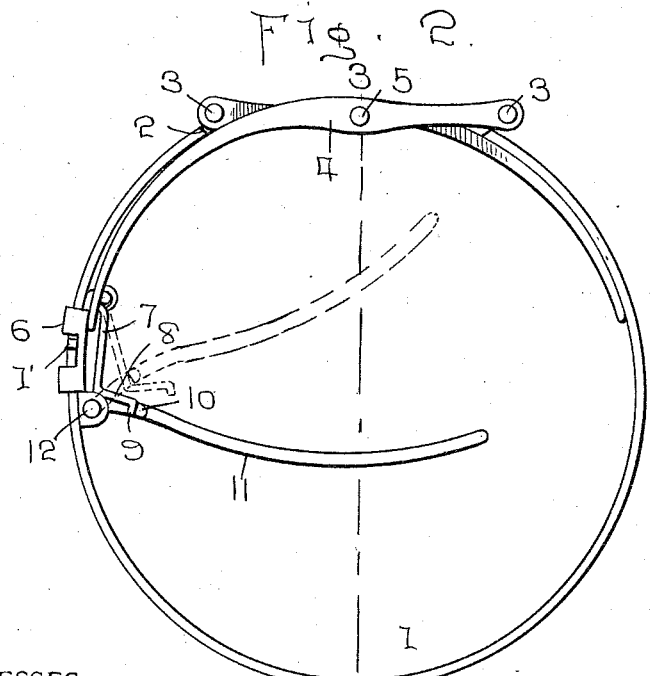

ANDREW NORSTEBON AND NORVALD NELSON, OF PORTLAND, NORTH DAKOTA.

TRAP.

1,005,868.  Specification of Letters Patent.  Patented Oct. 17, 1911.

Application filed May 11, 1911. Serial No. 626,458.

*To all whom it may concern:*

Be it known that we, ANDREW NORSTEBON, a subject of the King of Norway, and NORVALD NELSON, a citizen of the United States, both residing at Portland, in the county of Traill and State of North Dakota, have invented certain new and useful Improvements in Traps; and we do hereby declare the following to be a full, clear, and exact description of the invention, such as will enable others skilled in the art to which it appertains to make and use the same.

This invention relates to traps and more particularly to spring traps to be positioned in the hole or burrow made by animals such as moles, etc.

An object of the invention is to provide a trap of this character, which will be operated by an animal coming in contact therewith from either direction and will catch and hold the animal when said trap is sprung by an animal trying to pass.

Another object is to provide a trap of the above stated character, which may be positioned within the bore so as to be entirely hidden and which will contract, when set off, without tearing the ground, or giving the animal any chance to escape, and, another object is to provide a trap composed of a split hoop spring having pivoted victim gripping jaws secured to the meeting ends of said split hoop, and means for holding the split hoop spring in expanded position with the pivoted jaws resting against the inner surface thereof, until the trap is sprung by the animal.

Other objects and advantages will be hereinafter set forth and pointed out in the specification and claims.

In the accompanying drawings which are made a part of this application, Figure 1 is a plan view of the trap in closed position. Fig. 2 is a similar view of the trap in open or set position, the trip arm and its latch being shown in locked inoperative position by dotted lines, and, Fig. 3 is a cross sectional view on the line 3—3 of Fig. 2, looking in the direction of the arrow.

Referring to the drawings in which similar reference numerals designate corresponding parts throughout the several views, 1 represents the split hoop spring having the offset perforated rounded meeting ends 2, through which extend the pivot pins 3, carrying the victim engaging curved jaws 4, which are pivotally connected a short distance from their pivoted ends by the pivot pin, or other suitable means, 5.

Secured to the spring hoop 1 and movable thereon near the position assumed by the outer free end of one of the pivoted victim jaws 4, when the trap is set, is the bracket 6, which may be secured in any preferred manner and is limited in its movement by the lug 1' carried by the hoop 1. Pivotally connected to the bracket 6, inwardly of the hoop, is the latch 7 having its free end directed at right angles to the main portion, as shown at 8, and the outer extremity of the right angled portion turned at an angle to said portion to form the shoulder 9, against which the lug 10 of the trip arm 11 engages when the trap is set for the victim. The trip arm 11 is pivotally connected to the bracket 6, by means of the pivot pin 12 at the end of the bracket 6, opposite the end to which the latch arm 7 is pivoted. As will be noted, one of the jaws 4 is doubled and has its ends connected by a cross bar 4', over which the latch 7 extends to hold the trap set.

As is shown in Fig. 1, when the trap is in closed position the meeting ends 2 of the split hoop spring 1, normally rest against one another, as do the pivoted ends of the victim jaws 4, the pivot pin 5 of said jaws being inwardly of the hoop. As will be seen also, the trip arm 11 swings freely upon its pivot pin 12, the lug 10 of said arm being disengaged from the shoulder 9 of the latch arm 7.

To set the trap, the hoop spring is grasped near the ends thereof and drawn in opposite directions, to cause the victim jaws to cross one another and to assume the positions shown in Fig. 2, which is against the inner surface of the hoop swing. When in this position the pivot pin 5 of the arms 4 is between the pivot pins 3, to present a substantially hoop-shaped or circular trap. The trip arm 11 is then positioned practically straight across the hoop in the path of the movement of the jaws 4, the lug 10 being seated upon the shoulder 9 of the latch arm 7. This will prevent the hoop spring 1, which also forms the framework of the trap, from forcing the victim jaws 4 together, as the pivot pin 5 of these jaws is nearly at its dead center and the end of one of the jaws 4 is between the latch 7 and the bracket 6. The trap is then carried to the bore or burrow and placed therein, the trip arm 11 being moved until its lug 10 is on the edge of the shoulder 9, to insure the springing or setting off of the trap upon the slightest pressure against the trip arm 11. As will be understood, it is unnecessary to change the shape of the burrow in the least, as the trap may be placed therein so that the outer surface of the hoop or framework 1 engages against the side of the burrow. If desired, the steel hoop 1 may be covered to hide the latter. The trip arm 11 may also be hidden from the animal's view, if desired. Leaves or other material may be used to cover over the trap, as will be understood by those familiar with such devices.

It will be seen, that should an animal traveling through the bore, or attempting to enter or leave the bore, in case the trap is placed at the mouth of the bore, will be compelled to strike against the pivoted trip arm 11, throwing the lug of the latter free of the shoulder 9. As this releases the trap, the split hoop 1 will contract and force the pivoted ends of the victim jaws 4 toward one another, compelling the pivot pin 5 of said arms to fly inwardly toward the center of the trap. This will bring the victim engaging portions of the jaws 4 toward one another, catching and gripping the animal therebetween. As will be evident, the strength of the split hoop spring 1 is so great that it will be impossible for the animal to force the jaws 4 apart and escape. Therefore, the animal will be securely held by the trap, and, as a chain or rope, secured to the hoop 1 in the usual manner, is fastened to some stationary object or held by the trapper, it will be impossible for the animal to run away with the trap. As the securing of the chain or rope to the hoop 1 will be clearly understood by all familiar with traps and does not form a part of the invention, it is not shown in the drawings.

By moving the bracket up or down upon the frame 1 the pressure on the tripping arm may be increased or decreased as desired, the adjustment of the bracket being limited by the lug 1', as will be understood.

In Fig. 2 the trip arm is shown in its upward position and locked in this position by the latch 7, for the purpose of carrying the trap from one bore to another, eliminating the possibility of the trap springing or going off while in the trapper's hand or pocket, but readily allowing the proper placing and adjusting of the lug 10 upon the shoulder 9 when placing the trap within the bore.

It will thus be seen that we have provided a trap of extremely simple construction and operation and one which may be placed within the bore or burrow made by an animal of the mole class. It will also be seen that this trap in performing its duty will not harm the burrow, and cannot be caught and prevented from properly operating by the side of the burrow or any root or other object protruding into the burrow. It is therefore positive and accurate in operation, giving the animal no chance whatever of escape.

As the trap is of extremely simple formation, it may be manufactured and marketed at a very low figure, the price of the implement being within the reach of all users of such devices.

What we claim is:

1. A trap comprising a one piece split circular spring frame, victim jaws secured to the meeting ends of said split circular frame, one of the jaws being doubled and having its ends connected by a cross bar, a trip arm adapted to be positioned in the path of said victim jaws, and a latch for holding said trip arm in the path of said victim jaws, said latch being adapted to be placed over the cross arm and engaging against the trip arm to hold the trap set.

2. A trap comprising a split spring frame having its meeting ends provided with pivot pins, pivoted victim jaws carried upon said pins of said meeting ends of said frame, said meeting ends being adapted to normally rest adjacent one another, said ends being adapted to be drawn apart against the tension of said split spring frame until said victim jaws rest against the inner surface of said spring frame and the pivot point of said jaws is drawn nearly to its dead center, a trip arm carried by said frame, and means for holding said trip arm in the path of said victim jaws to be operated by the victim to release said trip arm from said holding means and allow the victim jaws to be forced toward one another by means of the spring frame to grip and hold the victim therebetween.

3. A trap comprising a split spring frame having its meeting ends provided with pivot pins, pivoted victim jaws carried upon said pins of said meeting ends of said frame, said meeting ends being adapted to normally rest adjacent one another, said ends being adapted to be drawn apart against the tension of said split spring frame until said victim jaws rest against the surface of said spring frame and the pivot point of said jaws is drawn nearly to its dead center, one of said victim jaws being double and having its ends connected by a cross bar, a bracket carried by said frame, a trip arm pivoted to said bracket, a latch arm pivoted to said bracket and adapted to be swung over the cross bar to hold the trap set, said latch arm having a shoulder, said trip arm having a lug to rest upon said shoulder when said trap is set for a victim to hold said trip arm in the path of said victim jaws to be operated by the victim to force said trip arm so as to compel the lug of said trip arm to slide off of said shoulder of said latch arm and allow the victim jaws to be forced toward one another by means of the said spring frame to grip and hold the victim therebetween.

4. A trap comprising a split spring frame having its meeting ends provided with pivot pins, pivoted victim jaws carried upon said pins of said meeting ends of said frame, said meeting ends being adapted to normally rest adjacent one another, said ends being adapted to be drawn apart against the tension of said split spring frame until said victim jaws rest against the surface of said spring frame and the pivot point of said jaws is drawn near its dead center, an adjustable bracket carried by said frame, a trip arm pivoted to said bracket, a latch arm pivoted to said bracket, said latch arm being adapted to hold said trip arm at its inoperative position, said latch arm having a shoulder, said trip arm having a lug to rest upon said shoulder when said trap is set for a victim to hold said trip arm in the path of said victim jaws to be operated by the victim to force said trip arm so as to compel the lug of said trip arm to slide off of said shoulder of said latch arm and allow the victim jaws to be forced toward one another by means of the said spring frame to grip and hold the victim therebetween, said latch arm resting over a portion of one of the victim jaws when the trap is set to prevent the jaws from moving toward one another until the trap is sprung.

In testimony whereof we have signed our names to this specification in the presence of two subscribing witnesses.

ANDREW NORSTEBON.
NORVALD NELSON.

Witnesses:
P. M. PAULSON,
H. P. HAGAN.

---

Copies of this patent may be obtained for five cents each, by addressing the "Commissioner of Patents, Washington, D. C."